May 15, 1956    W. KAFKA    2,745,205
ELECTRICAL FISHING EQUIPMENTS
Filed Aug. 9, 1950    5 Sheets-Sheet 1

INVENTOR:
WILHELM KAFKA
BY C. W. [signature]
ATT'Y

INVENTOR:
WILHELM KAFKA

May 15, 1956     W. KAFKA     2,745,205
ELECTRICAL FISHING EQUIPMENTS
Filed Aug. 9, 1950     5 Sheets-Sheet 4

INVENTOR:
WILHELM KAFKA
BY C. M. Avey
ATT'Y

May 15, 1956  W. KAFKA  2,745,205
ELECTRICAL FISHING EQUIPMENTS

Filed Aug. 9, 1950  5 Sheets-Sheet 5

INVENTOR
Wilhelm Kafka.
BY
ATTORNEY

United States Patent Office 2,745,205
Patented May 15, 1956

2,745,205

ELECTRICAL FISHING EQUIPMENTS

Wilhelm Kafka, Tennenlohe, near Erlangen, Germany, assignor to Siemens-Schuckertwerke, Aktiengesellschaft, Berlin-Siemensstadt, Germany, a corporation of Germany Application August 9, 1950, Serial No. 178,427

Claims priority, application Germany August 10, 1949

10 Claims. (Cl. 43—17.1)

My invention relates to apparatus for facilitating fishing operations by electrically influencing or stunning the fish.

Such apparatus make use of the physiological facts that the swimming direction of fish can be influenced by an electrical field, that the fish are stunned at a certain voltage and are killed at a higher voltage or at a longer duration of the electrical influence. In any case it is necessary to exceed a certain minimum voltage whose value is independent of the size or length of most fish of the same kind. As a rule a different minimum voltage is to be applied for respectively different kinds of fish. This voltage, in the following called "shape voltage," has to be effective between head and tail of the fish during a certain minimum period of time (approximately 2 microseconds) to cause a reaction on the fish. The shape voltages differ in most cases only between approximately 0.5 and 2.5 volts.

There are no difficulties of generating and controlling voltages of the necessary magnitude when fishing electrically in fresh water of low electrical conductivity and at small distances. The swimming direction of the fish can only be controlled by producing an electrical direct-current field or by a field produced with a current having a predominant direct-current component. Therefore, the application of such currents is preferable for electrical fishing. In sea water at large distances, however, and especially on the open sea where the electrical resistance of the salt water is low, difficulties are encountered when using direct current because of the extremely large energies then necessary. It has been suggested therefore to apply only short direct current impulses to the water instead of a constant direct current. It has been found that this results not only in a substantial saving in energy but also secures a much more successful action on the fish.

Relating to such direct current pulse operated fishing apparatus, it is an object of my invention to provide equipment which is not only of simple design and of small energy consumption but affords also a large variety of possibilities of being applied to various sizes and kinds of fish.

Another object of the invention is to produce a large sphere of influence which need not be located in the immediate vicinity of the fishing station, for instance of the fishing boat, but may also be located at a greater distance thereof as is required for fishing in large areas, especially at sea.

According to a feature of my invention, the electrical fishing equipment for passing current pulses through the water by means of electrodes has pulse generating means whose pulses are produced by discharging a condenser permanently connected to a source of direct current, and substantially non ohmic current-limiting means are provided for limiting the charging current of the condenser during the discharge period and as long as the counter voltage of the condenser is still low as compared with its full voltage.

Since the impulse condenser is permanently connected to a direct current source, it is charged automatically after each discharge. For fishing on sea where not only high voltage but also high current are required, the capacity of such an impulse condenser has to be very high and may have the value of some thousands of microfarads. At the beginning of the charging period of the impulse condenser therefore, this condenser acts like a short circuit for the direct current source, i. e. the charging current is extremely high as long as the countervoltage of the condenser is still low. This circumstance would be detrimental to the direct current source, especially if the source is an alternating current generator and a rectifier, because in this case the rectifier will be subjected to an extremely high overload. By using means according to the invention for limiting the charging current these difficulties are eliminated. For the purpose of initiating the impulse discharges of the condenser it may be advantageous to use electrical vapor discharge valves because they operate without inertia and are able to control extremely high currents. It is typical for such valves that, once ignited, they cannot interrupt the current unless the current itself decreases to zero. Therefore, the impulse condenser must be discharged in the form of an oscillation so that the discharge pulses fall through zero thus permitting the vapor discharge valve to interrupt the current at the end of each positive discharge current pulse. Due to the fact that a direct current source is always connected to the impulse condenser, the decrease of the current to zero is possible only if during the period of the discharging oscillation the charging current is kept small in comparison to the discharging current of the impulse condenser. By using the above mentioned means of limiting the charging current, this effect is indeed obtained and the use of an electrical vapor discharge valve for producing the impulses is greatly facilitated.

According to a more specific feature of my invention, the above-mentioned charge limiting means consist of a choke coil connected in series with the impulse condenser and the direct current source. Such a choke coil affords the further advantage that the self-induction voltage of the choke coil, which is originated in the coil at the end of the charging period of the condenser, causes the condenser to be charged with a voltage higher than that of the direct current source. Hence, the direct current source, for instance the direct current generator, may be dimensioned for a voltage much lower than that necessary for the impulses to be sent into the water.

Instead of limiting the charging current by means of a choke coil, a constant current generator may be used as a direct current source. A generator of this known type generates a current of a certain maximum value due to a particular arrangement and connection of its exciting windings and therefore is short-circuit proof. For details of construction of such constant current generators, reference can be had to the textbook Elektrische Maschinen, by Theodor Bödefeld and Heinrich Sequenz, Fourth Edition, published in 1949 by Springer Publishing Co., Vienna (Austria).

According to another feature of my invention the apparatus is made adaptable for different sizes or kinds of fish by providing means for varying the pulses as to their individual duration and also as regards their frequency (number of pulses per second). To this end, the capacity of the impulse condenser may be made changeable, for instance, by subdividing the impulse condenser in several elements to be selectively connected in parallel and/or series relation. Furthermore, it is recommended to also provide for selectively changing the inductivity of the choke coil in the charging circuit of the impulse condenser by subdividing the winding of the coil into portions to be connected in different ways. In this manner the condenser and the choke coil may be put in such a relation that the intervals of time between successive discharge pulses are fully utilized for charging the impulse condenser. This makes it possible to start the transmission of each pulse into the water at the instant when the charging of the impulse condenser is completed. This has the further advantage that the switching means for issuing the impulses can be automatically controlled in relation to the charging current or another charging condition of the condenser.

Further features and advantages of the invention will be apparent from, or referred to in the following description of the various examples schematically shown in the drawings in which.

Figure 15:
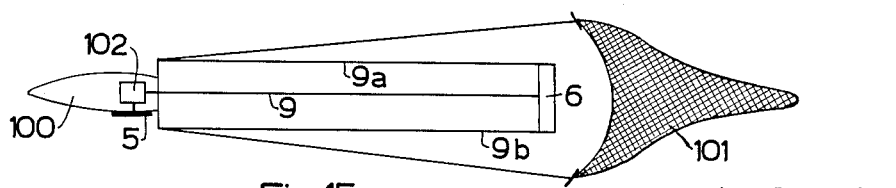
Figure 13:
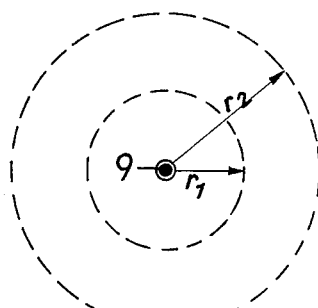
Figure 14:
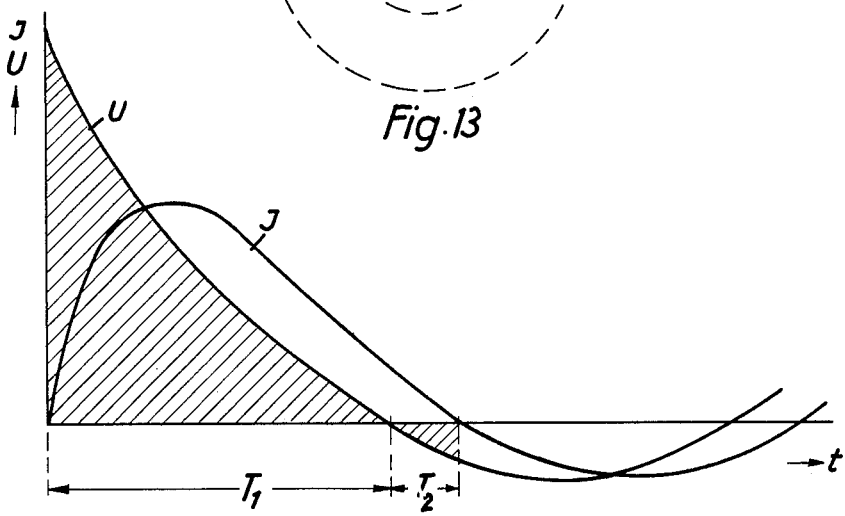

Fig. 13, also explanatory, relates to the sphere of influence in the water;

Fig. 14 is a coordinate diagram of a discharge operation of the impulse condenser; and Fig. 15 shows another modification of apparatus according to the invention in conjunction with a dragnet.

The same reference numerals are applied in the various figures for denoting respectively similar elements.

Figure 1A:
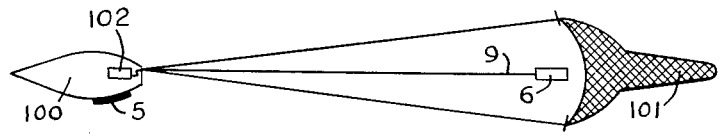
Fig. 1a exemplifies diagrammatically the use of such apparatus with a dragnet.
Figure 1:
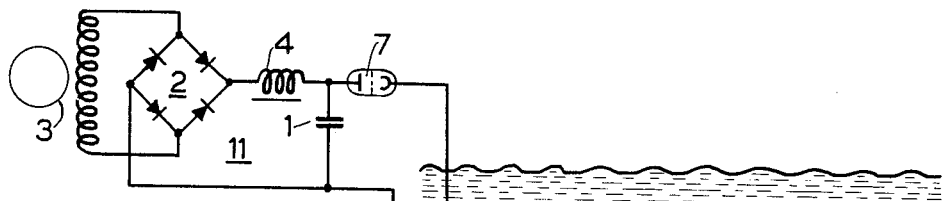
Fig. 1 is an electric current diagram of fishing apparatus according to the invention.

In Fig. 1 the impulse condenser or a battery of condensers is denoted by 1. Its charging circuit consists of a rectifier arrangement 2, an alternating-current generator 3 and a choke coil 4. Two electrodes 5 and 6 are arranged in the water and are spaced apart a suitable distance for producing the desired field of influence. The two electrodes 5 and 6 are shown schematically, it being understood that all convenient types or shapes may be used. The electrodes are connected by insulated wires or cables 8, 9 in parallel relation to the impulse condenser 1 through a switching device 7. The switching device 7 is designed to close the condenser discharge circuit 10 during very short periods, thus producing very short current impulses, for instance several times per second. The discharge circuit 10 consists of the impulse condenser 1, the switching device 7, the insulated wire or cable 9, the electrode 6, the electrode 5, the water between these two electrodes and the wire or cable 8. The illustrated switching device 7 is an electronic relay, for instance, an ignitron, i. e. a vapor discharge valve which is ignited periodically by voltage impulses and which after each ignition remains conductive until the current passes through the zero value. The control circuit (not shown in Fig. 1) for the switching device 7 will be described below.

In the charging circuit of the impulse condenser 1 (Fig. 1) the current-limiting choke coil 4 is inserted between the rectifier 2 and the impulse condenser 1. The connection illustrated in Fig. 1 has the advantage that the self-induction voltage which is produced by the choke coil 4 at the end of each condenser charging period and which has the same direction as the charging current, will boost the voltage across the impulse condenser 1 beyond the voltage at the terminals of the rectifier 2. This increased voltage of the impulse condenser 1 causes a correspondingly increased impulse in the above-mentioned field of influence between the electrodes 5 and 6. This results in increased effects upon the fish or makes it possible to use direct-current sources of lower voltage. In the example of Fig. 1, a single-phase alternating-current source is shown. If three-phase current is used the rectifier arrangement is to be changed correspondingly to a three-phase connection.

Figure 2:
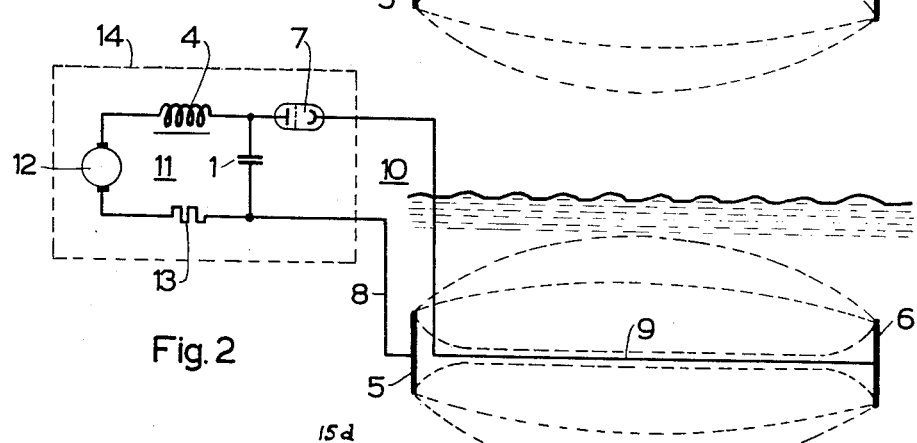
Figs. 2 to 5 are circuit diagrams of respective other embodiments of apparatus according to the invention.

The apparatus shown in Fig. 2 differs from that of Fig. 1 mainly in having a direct-current generator 12 used as the current source. The other elements of the equipment are the same as in Fig. 1, except that the charging circuit 11 includes an additional series resistor 13 whose purpose will be described below. The parts shown in Fig. 2 enclosed by the dotted lines 14 are mounted on the fishing station, for instance aboard the ship. The electrodes 5 and 6, however, lie in the water.

For large-area fishing on the open sea high currents and high voltages are necessary. Therefore, switching devices with mechanically moved switching elements for controlling the periodic discharges of the impulse condenser 1 can be used only if special means are provided to reduce the danger of arcing liable to occur at the switch contacts under such current and voltage conditions. On the other hand, the use of the mentioned vapor discharge valves having a control grid or other ignition means also causes some difficulties, since the roll of the relatively small fishing boats lead to a movement of the mercury pool contained in the discharge valves. I have found that the danger of arcing on mechanically moved switches for the pulse control of the active circuit 10 may be eliminated by providing this circuit with means which, after the current wave has passed through the zero value, bar or delay the rise of the reverse current in the negative direction at least until the switching device has opened the active circuit 10.

Figure 3:
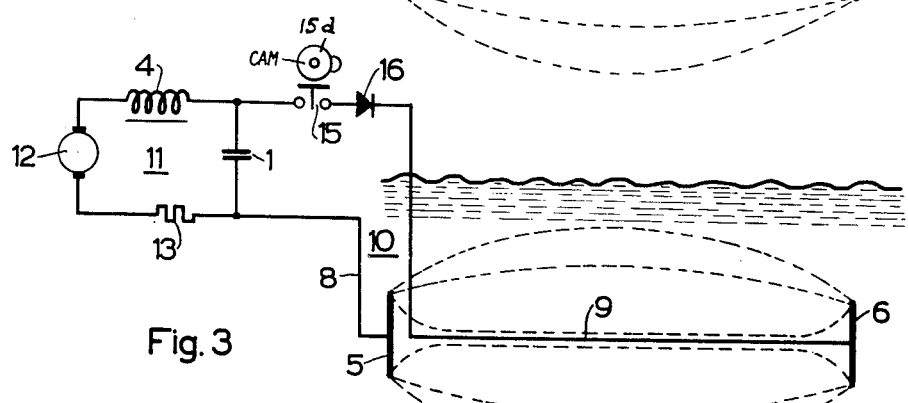

For instance, the apparatus shown in Fig. 3 has a switching device 15 with mechanically moved switching elements, shown only schematically, arranged in the active circuit 10. An electrical valve 16, especially a dry (barrier-layer) rectifier, is connected in series with the switching device 15. Valve 16 is poled to pass the discharge current of the impulse condenser 1 when switch 15 closes. Hence, valve 16 has a high resistance to the flow of current in the opposite direction. With respect to the mechanical switching device 15, I prefer to use breakers or contactors designed for interrupting high energies at a high speed of the contact members and with a relatively high contact pressure since not only high currents are to be switched but also relatively high voltages. Due to valve 16, the opening of the contact members may be effected immediately after the interruption of the current by that valve. At that moment the current is practically at the zero value and the recharging of the impulse condenser has not yet increased to such a degree that currents of injurious magnitude can pass through the gap of the switch 15. Consequently, the wear at the contacts of this switch is very small. The electrical valve 16 has to resist a certain voltage in the reverse direction during intervals of only short duration. Hence, it may be dimensioned for a voltage much lower than the voltage of the condenser 1.

Figure 4:
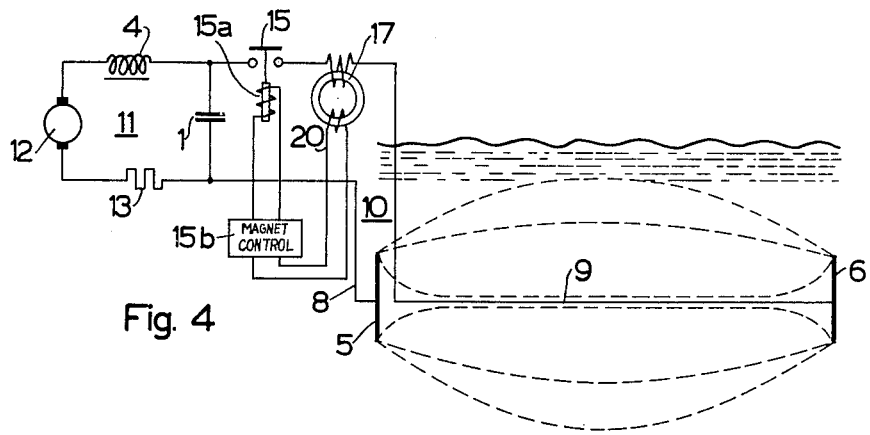

Instead of the valve 16 connected in series with the switch 15 in Fig. 3, the apparatus shown in Fig. 4 has a saturable reactor 17 inserted in the active circuit 10. Reactor 17 has a core with a steep and approximately rectangular magnetic characteristic obtained by a suitable choice of core material and winding design. Due to the rectangular shape of the magnetic characteristic the rise of the current in the negative direction is delayed for a short time after the current zero passage. This delay is due to the fact that the reactor core becomes temporarily unsaturated at the low instantaneous current values near the zero passage so that the inductivity of reactor 17 is temporarily increased and an almost currentless interval appears during which the switch 15 may open its contacts without arcing.

Such a saturable reactor 17 may be used also in order to facilitate the closing of the switch 15 since it also delays a quick rise of the current in the positive direction.

Figure 5:
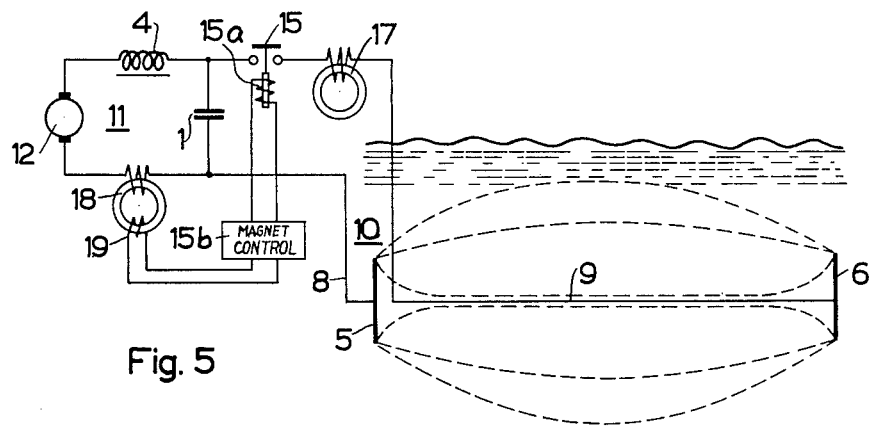

The switch 15 may be closed by mechanical means, for instance by cam-controlled means as indicated at 15c in Fig. 3, or by control magnets (Figs. 4, 5). The moment for the closing of the switch can be put in an automatic control relation to the charging condition of the impulse condenser 1 because, as explained below, the voltage across the ohmic resistor 13 reverses its polarity at the end of the charging period of condenser 1 due to starting of the discharge and hence can be used for closing the switch 15 (see Fig. 7).

It is also possible to control the closing of the switch 15 in dependence upon the magnitude of the condenser charging current. Fig. 5 shows a corresponding example. Inserted in the charging circuit 11 is a choke coil 18 which has a magnetic characteristic of the same type as the saturable reactor 17 in Fig. 4. In an additional winding 19 a voltage pulse is induced during the momentary desaturation of the core produced by the charging current approaching the zero level. This momentary voltage is applied to the control 15b for the control magnet 15a of the switch 15.

Also a small winding 20 may be placed on the saturable reactor 17 (Fig. 4) to produce near the current zero passage a voltage pulse which causes the control means 15b of the switch control magnet 15a to open the switch 15.

Figure 6:
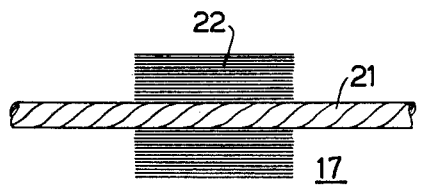
Fig. 6 illustrates schematically a saturable reactor to be used in apparatus according to the invention.

Fig. 6 shows a very simple form of the saturable reactor 17. This reactor comprises only a single conductor 21 connected in series with the line 9 (Fig. 5), i. e. in series with the switch 15. A thin ribbon 22, consisting of a nickel-iron alloy, is concentrically wound around the wire 21.

It has already been stated that the influence upon the fish depends on the steepness of the impulses as well as on the voltage drop along the body of the fish, and furthermore on the frequency and duration of the impulses. If either the size and the length of the fish to be caught, or the conductivity or saltiness of the water becomes different, or if fish of a different shape voltage are to be caught, then it is necessary or advantageous to change the voltage of the impulses, their duration and frequency, in order to meet the new requirements. For this purpose provisions should be made for varying the inductivity of the choke coil 4, the capacity of the impulse condenser 1 and the voltage of the direct-current source (2, 3 in Fig. 1, and 12 in Figs. 2 to 5).

Figure 7:
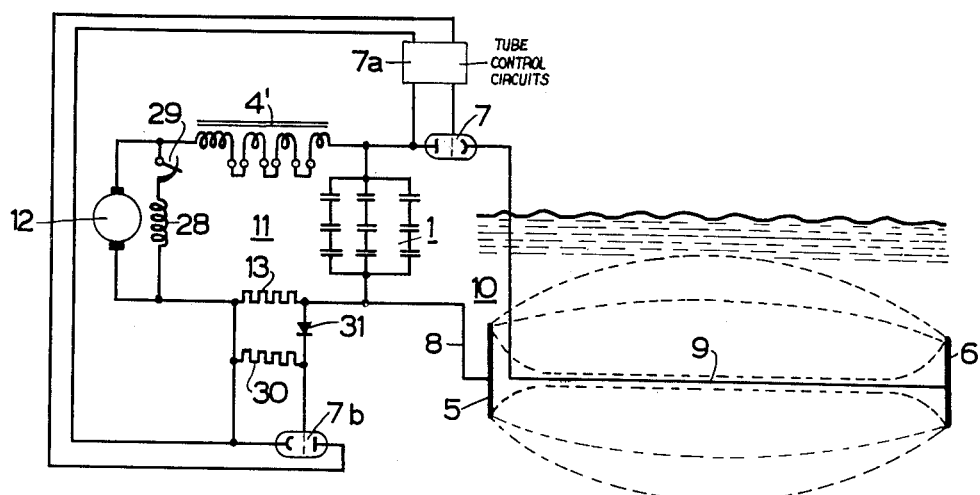
Fig. 7 is the circuit diagram of another embodiment of the invention.

According to Fig. 7, which otherwise shows chiefly the same arrangement as Fig. 2, the winding of the choke coil 4' is subdivided in several groups of windings, which can be connected in series and/or parallel, by means not shown, in order to change the inductivity of the choke coil 4'. In the drawing, all winding groups are shown connected in series so as to obtain maximum inductivity of the choke coil 4'. The impulse condenser 1 is also subdivided into several elements, which can be connected in series and/or parallel by suitable switching means to change the resulting capacity. In the drawing three groups of condenser elements are shown in parallel connection, each group consisting of three elements connected in series. For controlling the charge voltage of the impulse condenser 1, the direct-current generator 12 is provided with a shunt field winding 28 to which a regulating resistor 29 is connected in series.

Changes in voltage of the generator 12 should be as slow as possible to fully utilize the effect of the choke coil 4' of boosting the voltage across condenser 1 beyond the voltage of the generator. It is therefore favorable to adjust the inductivity of the choke coil 4' so that the charging of the condenser takes place as an oscillation whose half cycle has the same duration as the time interval between two consecutive discharge pulses. Then the charging of the condenser 1 is just finished at the moment when its discharge into the active circuit 10 starts. The whole available interval can thus be used for charging the condenser 1 with the result that the voltage and the current of the generator 12 may be reduced to a minimum. Besides under these conditions the total induction voltage induced in coil 4' at the end of the condenser charging period is utilized for boosting the condenser voltage.

Figure 8:
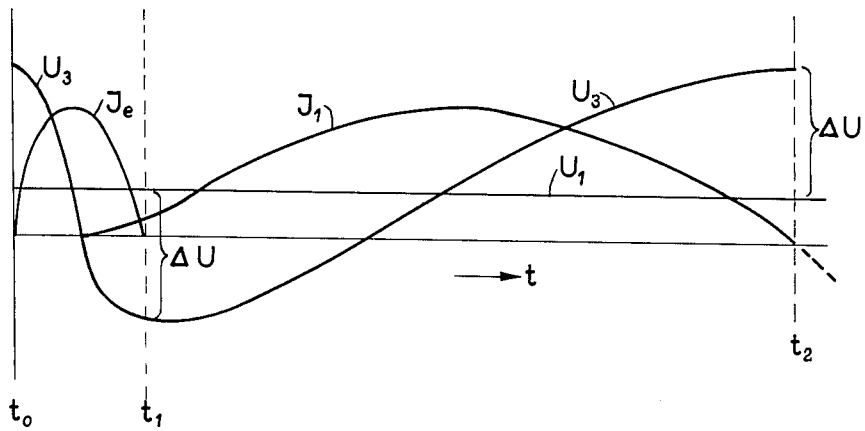
Fig. 8 shows a coordinate diagram of current and voltage waves explanatory of the operation of the pulse condenser in the apparatus according to the invention.

This will be more fully understood from the diagram of Fig. 8. Assume that the condenser 1 is charged to the full voltage and that at the moment $t_0$ the vapor discharge valve 7 is ignited. Then the discharge of the condenser 1 into the active circuit 10 will start. Because of the inductivity of the active circuit 10 and especially due to the inductivity of the water gap between the two electrodes 5 and 6, the discharge takes place as an oscillation. First the discharging current $J_e$ rises to a maximum value and then drops to the zero line at the time $t_1$. During this period the voltage $U_3$ of the condenser 1 reaches its negative maximum. As the vapor discharge valve 7 blocks the flow of reverse current after the current reaches the zero line, the discharge of the condenser 1 is finished. Consequently the interval $t_0 - t_1$ is the impulse duration.

The condenser 1 is permanently connected through the choke coil 4' to the generator 12 which has the voltage $U_1$. Therefore the current $J_1$ starts at the moment when the voltage $U_3$ drops below $U_1$. However, the current $J_1$ increases rather slowly in consequence of the inductivity of the choke coil 4'. At the time $t_1$ the real charging of the condenser 1 starts as an oscillation, i. e. the voltage $U_3$ rises about like a sine wave whose zero level is represented by the voltage $U_1$. This lasts until, at the time $t_2$, the charging current $J_1$ again reaches the zero value at the end of the first half cycle of the oscillation. At the time $t_2$, the voltage $U_3$ is at its positive maximum. Consequently the cycle can start again with the time $t_2$ representing the time $t_0$ for the subsequent impulse. As shown in the figure, the voltage $U_1$ of the generator 12 (Fig. 7) is lower by the value $\Delta U$ than the charging voltage $U_3$ of the condenser 1 at the final moment $t_2$ of the charging period. Since the charging takes place as an oscillation, this voltage difference $\Delta U$ must already be present at the time $t_1$, that is at the beginning of the charging oscillation. The voltage difference $\Delta U$ depends on the course of the discharging oscillation and consequently on the damping resistance of the circuit 10. Depending upon the damping of the oscillation in the action circuit 10 (Fig. 7), the required generator voltage may have only ½ to about ⅓ of the value of the discharging voltage on the condenser.

It should be noted that in Fig. 8, for the purpose of convenient illustration, the discharging current $J_e$ is drawn on a smaller ordinate scale than the charging current $J_1$.

With the distance between electrodes 5 and 6 given, the discharging period $t_0$–$t_1$ depends essentially only on the capacity of the impulse condenser 1. Hence, with a given discharging period, the tuning of the charging circuit 11 can only be effected by changing the inductivity of the choke coil 4'. If the capacity of the condenser 1 is changed, for instance in consequence of a change in the distance between the electrodes or in the conductivity of the water, the inductivity of the choke coil 4' must be changed correspondingly in order to reestablish the above-mentioned tuning conditions.

In order to have the discharge of the condenser 1 start always at the time $t_2$ so that the full interval between two consecutive impulses is used for charging the condenser, it is advantageous to make the ignition control of the vapor discharge valve 7 responsive to the charging current of the condenser 1. The criterion for the end of the first half cycle of the charging oscillation and hence for the maximum value of the voltage $U_3$ on the condenser 1 is the passing of the charging current $J_1$ through the zero line. Therefore it is useful to insert into the condenser charging circuit 11 a controlling means sensitive to the direction of the current and effective to close the active circuit 10 the moment when the discharge current $J_e$ reverses its direction. The above-mentioned resistor 13 in the charging circuit 11 may be used for that purpose. The voltage drop across resistor 13 reverses its polarity when the current $J_1$ passes through the zero level.

A current-direction responsive control of the just-mentioned kind is incorporated in the embodiment of Fig. 7. As shown, an electronic control tube 7b has its grid circuit connected across resistor 13 so as to be controlled by its reversible voltage drop. During the charge of the impulse condenser 1, a negative blocking voltage is effective on the control grid of tube 7b. At the time $t_2$ (Fig. 8) the grid voltage suddenly turns positive so that the anode current of the control tube begins to flow and causes the switch control means 7a to close or ignite the switching tube 7.

The electronic control circuit indicated in block form at 7a, serving to ignite the discharge valve 7, which is preferably an ignitron, comprises a thyratron connected in parallel with the discharge valve 7 operating as an ignition tube whose control grid is normally biased to cut-off. The cut-off bias voltage applied to the grid is eliminated by a positive voltage at the moment tube 7b becomes conductive, so that the thyratron then conducts current and thus initiates the ignition of the ignitron 7. At the ignition moment of ignitron 7, the voltage applied across the ignitron breaks down so that the ignition tube (thyratron) is again extinguished.

The control voltage for the switching device 7 may also be picked up at the terminals of a resistor 30 connected parallel to the resistor 13 through an electric valve 31, for instance a dry disk rectifier. During the charging period of the impulse condenser 1 the voltage between the terminals of the resistor 30 is zero because of the blocking effect of the valve 31. After the reversal of the current, a shunt current flows through the valve 31 and the resistor 30 so that a voltage drop appears across this resistor 30 and causes closing of the switching device 7.

If the impulse condenser is charged by a rectifier (Fig. 1) with a voltage $U_1$, the voltage difference $\Delta U$ occurs at the time $t_2$ with reversed polarity and acts as an inverse voltage on the rectifier. This inverse voltage may also be used for controlling the switching device 7. Its steep rise makes it especially useful for such purposes.

On the equipment shown in Fig. 7 the charging and discharging operations of the impulse condenser 1 follow each other without any interval, one automatically starting the other. This makes it conveniently possible to adjust also the pulse frequency according to the requirements by changing the duration either of both operations or of only one of them.

As already pointed out, in order to save energy and also because of the intended influence on the fish the impulses must have a short duration. Hence, in respect of the speed of current rise each impulse has the same effect as a single impulse of a very high frequency. The current flowing through the water between electrodes 5 and 6 is therefore distributed in such a way, that the current density is a maximum near the insulated line 9 (Figs. 1 and 2) and decreases relatively quickly with increasing distance. The field of influence is thereby limited to a certain area around the supply line 9 for the more distant electrode 6. In order to obtain a sufficient efficiency within a large field of influence, extremely high impulse energies are required because of the high conductivity of salt water. Therefore the supply lines 8 and 9 to the electrodes 5 and 6 must have a big diameter. This big diameter, especially of the supply line 9 for the more distant electrode 6, causes difficulties due to increased weight and inconvenience in manipulation of the cables. Besides, even with a big line diameter the resistance and inductivity of the line remain disturbing and impair the efficiency.

Figure 10:
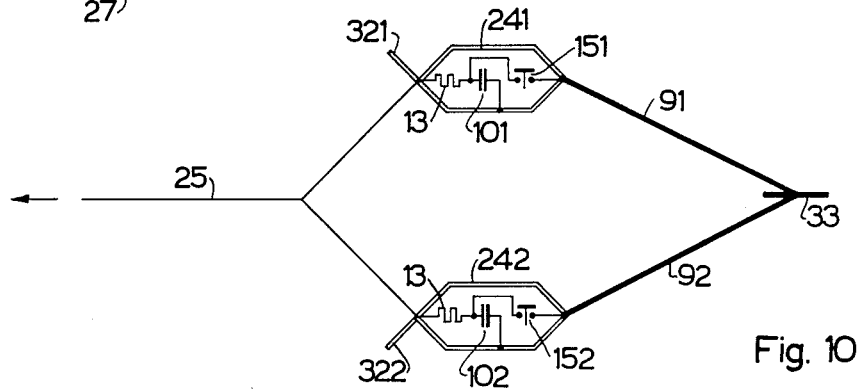
Figure 11:
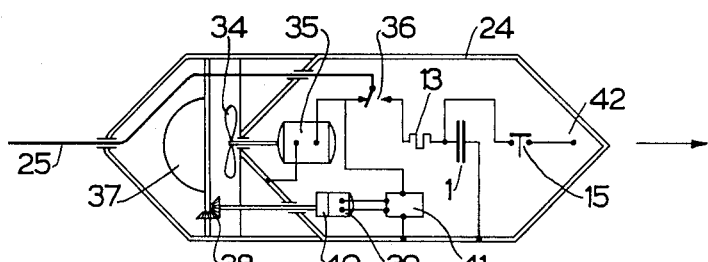
Fig. 11 shows partly in section a modified form of a floating container for the impulse condenser.

I have found that these difficulties can be overcome by arranging the impulse condenser in a floating container distant from the fishing station or the boat. Examples of this kind are shown in Figs. 9 to 11.

Figure 9A:
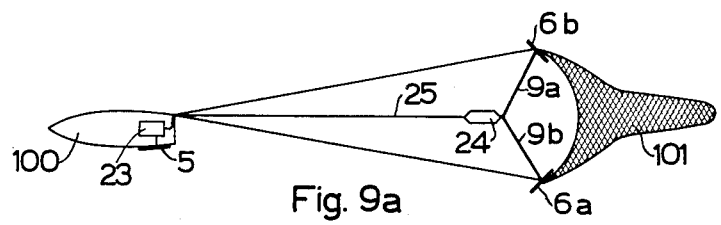
Fig. 9a shows how such an apparatus may be employed with a dragnet.
Figure 9:
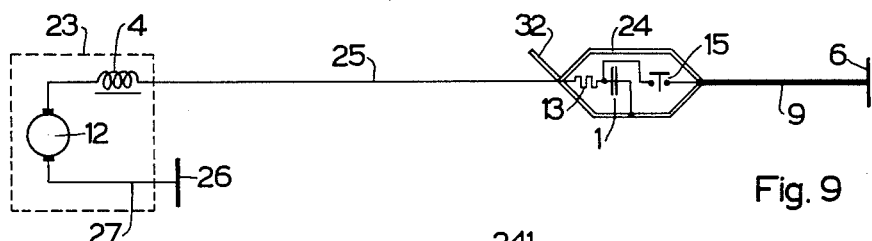
Figs. 9 and 10 illustrate diagrammatically two further embodiments respectively, each equipped with a floating container for the pulse condenser.

According to Fig. 9, the fishing station 23, marked by a dotted line, accommodates only the direct-current source 12 and the choke coil 4. The impulse condenser 1, however, is enclosed in a waterproof container 24. One terminal of condenser 1 is connected to the current source 12 by a one-wire cable 25. The second terminal of the condenser may be connected to the metallic walls of the container 24 or to a special electrode placed in the vicinity. The charging circuit of the impulse condenser extends from one pole of the direct-current source 12 through the choke coil 4 and the supply line 25 to the condenser 1, and from the electrode 6 or the housing 24 through the water to an electrode 26 connected by a lead 27 to the other pole of source 12. The electrode 26 may be arranged like the electrode 5 in Figs. 1 to 5 either directly on, or in the vicinity of, the fishing station or boat. Since the impulse duration amounts to only a small portion of the preceding impulse interval, a very long time is available for charging the impulse condenser 1 in comparison to its discharging time (the impulse duration may be approximately 2 msec., the impulse interval approximately 100–200 msec.). In consequence, the charging current of the impulse condenser flowing through the supply line 25 can be kept low in comparison with the discharging current impulses of the impulse condenser 1 which may rise to several thousands of amperes. Therefore, only a single relatively thin insulated wire for the charging of the condenser is needed between the charging current source on the fishing station 23 and the container 24. This permits increasing the distance between the electrically active field and the current source or the ship 23, and there is a greater choice of adapting the position of the field relative to the fishing station according to the various fishing requirements.

The field of influence lies electrically parallel to the condenser 1. The remote counterelectrode 6 is connected by the supply cable 9 through the switch 15 to the impulse condenser 1 whose other terminal is connected to the container 24. The container 24 acts as an impulse electrode as well as an electrode for charging the impulse condenser. The control of the switch 15 may be performed in a similar manner as described above. There is also the possibility of a remote control from the fishing station 23, by using known means. This may be done by high frequency impulses superimposed on the cable 25 or by means of a thin wire added to the cable 25. Because of the rolling motion of the container 24 in which the switch 15 is enclosed, it is necessary to use a switch with mechanical switching members moved by means of magnets. Hence, the means described with reference to Figs. 3 to 5 are applicable for the control and operation of the switch 15.

For net fishing on sea the net is dragged several hundred meters behind the boat. It is known that the number of fish actually caught by the net is only a small portion of the fish present in the area through which the net is being dragged. This is due to the fact that most of the fish flee from the net. Therefore great progress is attained if the flight is prevented by electrical means. For this purpose a relatively small field of influence of the electrical fishing equipment may be sufficient, and the container 24 with the condenser 1 and with the counterelectrode 6 at a relatively small distance from it, can be arranged in front of the net opening. The axis of the electric field may be either parallel to the dragging direction of the net, as shown in Figs. 1a and 9a, or it may be arranged differently, for instance perpendicularly to the dragging direction of the net.

It is also possible to use instead of one electrode 6, two or more electrodes, arranged symmetrically to the container 24 which is then located in their middle, in front of the net opening. Such an arrangement is shown in Fig. 9a where two electrodes 6a and 6b are located on both respective sides of the container 24 in front of the net 101. Two leads 9a and 9b connect the respective electrodes 6a and 6b with the housing. As explained, the counterelectrode 5 and the power supply unit 23 are located on the boat 100. For controlling the moving direction of the fish, the container 24 should be positive and the electrodes 6a, 6b negative. Then any fish coming into the field of influence will be directed to the middle, i. e. against the container 24 of the condenser, and will be caught by the advancing net.

According to Fig. 10, it is also possible to subdivide the condenser and to enclose it in two or more containers 241, 242, where each portion of the capacitor 101, 102 may have its own switching device 151, 152. It is useful to connect the two switching means 151, 152 for combined control, for instance, by a special conductor (not shown). Then each container 241, 242 may be made smaller and may be manipulated more easily. The containers may be kept in a certain distance from each other by providing them with directing means, for instance, guiding boards 321, 322. Each container 241, 242 may have its own counterelectrode which is connected to its corresponding capacitor 101, 102 by a special cable. It may also be useful to have only one counterelectrode 33 connected to the two capacitors 101, 102 by cables 91, 92. If this arrangement is placed in front of the drag net, it is advantageous to connect the switching means in such a manner, that the counterelectrode 33 is connected to the positive terminals and the containers 241, 242 are connected to the negative terminals of the capacitors 101 and 102 respectively, in order to obtain a swimming direction of the fish toward the center of the net opening.

The possibility of increasing the distance between the field of influence and the boat by enclosing the impulse condenser and its switching means in a floating container offers a further advantage. When catching big fish, for instance tunnies or whales, the electrodes can be dragged into the vicinity of the fish by convenient maneuvering of the boat rather than moving the boat itself near the frightened fish. The boat may either cross the supposed course of the fish, or the electrodes 6, 24 (Fig. 9) may be placed in the vicinity of the fish by using guiding means 32 on the container 24.

If, as mentioned above, the electrodes are arranged in front of the net or beside it, it is not absolutely necessary to influence the swimming direction of the fish if the electrical field is intensive enough to cause electronarcosis (stunning) or killing. Under such conditions there is the possibility of discharging the condenser 1 (Fig. 9) or 101, 102 (Fig. 10) by an oscillation caused by the fact that the discharging circuit acts as a damped oscillatory circuit because of the capacity of the impulse condenser, the inductivity of the electrode supply lines, and the inductivity of the water gap between the electrodes. Therefore it is merely necessary to keep the switches 15 (Fig. 9) or 151, 152 (Fig. 10) closed until the discharging oscillation is practically finished. In this way intensive effects on the fish may be obtained by producing only a relatively small quantity of energy at the source 12.

The permissible small diameter of the charging cable 25 in Fig. 9 makes it also possible to move the field electrodes into the fishing area, for instance into the vicinity of big fish, such as whales or tunnies, over large distances by motorpower. For that purpose the container of the condenser (Fig. 11) may have a driving propeller 34, driven by a direct current motor 35. The motor 35 is energized from the direct current source 12 on the boat (Fig. 9) through the cable 25 and through a double-throw switch 36. This switch 36 is thrown over when field pulses are to be issued and then completes the connection to the impulse condenser 1 while disconnecting the motor 35. Now the device operates like the device of Fig. 9. The energizing circuit for the motor 35 is closed through the water gap between the container 24 and the electrode 26 (Fig. 9). The control of the switch 36 can be effected from board of ship by remote control as described above.

The container of the condenser 24 may also be teleguided. For this purpose it may have a vertical rudder 37 controlled by a gear 38 which is driven from a small steering motor 39 preferably through an intermediate reduction gear 40. The motor 39 can be controlled from the boat through the supply cable 25, for instance by means of superimposed high frequency impulses. This is indicated in Fig. 11 by a control device 41, which is inserted between the left contact member of the switch 36 and the container 24 so that the water acts as a return line. The control device 41 receives the control commands from the boat and causes the intended motion of the rudder motor 39. If necessary the container 24 may also have a horizontal rudder controlled in a similar manner.

The supply cable connecting the terminal 42 to the counterelectrode (not shown in Fig. 11) may be dragged. With the device shown in Fig. 11 it is possible to teleguide the electrodes toward the fish, to issue operating impulses, and to paralyze or kill the fish. This considerably facilitates catching big fish that, as a rule, are easily frightened.

As pointed out, large energies are necessary for fishing in salt water. It is therefore necessary to keep the impulses and their duration as small as possible and to keep the impulse intervals for charging the impulse condenser as large as possible. However, the impulse voltage is given by the intensity of the electrical field to be produced for sufficiently affecting the fish, and the impulse duration must have a certain minimum value. If the duration is less than a certain minimum value, for instance less than 1.5 to 2 msec., even a voltage in the amount of the "shape voltage" is without effect.

Impulses which meet these conditions tend to give the current returning through the water a density which is a maximum nearest to the cable and diminishes relatively quickly as the distance increases. Without any special precautions there exists the danger that the impulses are only effective within a small area around the cable 9. If it is intended to increase the influence area with an unchanged impulse duration only by increasing the voltage, the required energy would become uneconomically high.

I have found that good effects are also obtained by diminishing the duration of the impulses below that value at which the shape voltage on the fish is the smallest one. In other words, the duration of the current impulses in the immediate vicinity of the cable should be so small that the impulses would have no appreciable effect up to a certain distance from the cable 9 if the impulse voltage had only the value of the normal "shape voltage" (for instance about 0.5 to 2.5 volts per fish). This will be explained with reference to Figs. 12 and 13.

Figure 12:
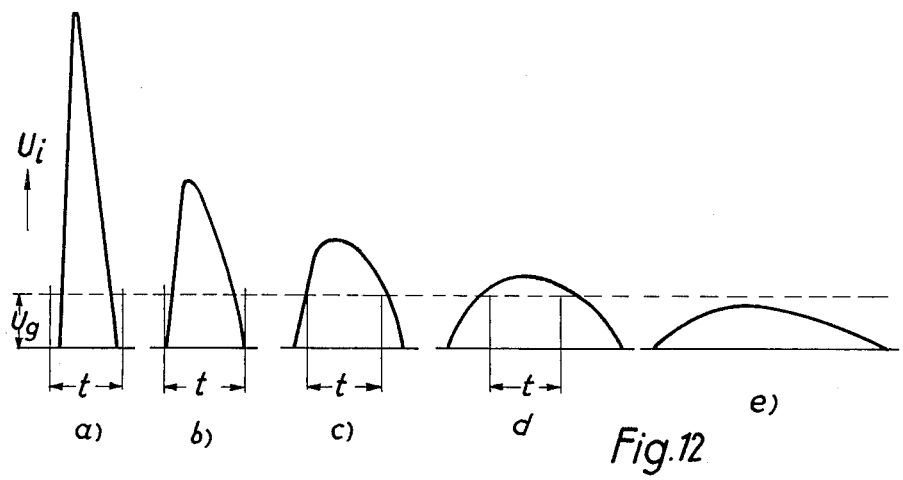
Fig. 12 is an explanatory coordinate diagram showing several different wave shapes of the issued current pulses.

Fig. 12 shows schematically that the impulses become lower and wider with increasing distance from the supply line 9. Since only the first half cycles are of interest, only this portion is shown. The voltage magnitude necessary for imposing the "shape voltage" on the fish to be caught at a given distance between the electrodes 5 and 6 is denoted by $U_g$. The minimum duration during which the impulses must have the voltage $U_g$ in order to affect the fish is denoted by $t$. As stated, the duration of the operating impulses should be shorter than the period of time $t$ during which the minimum voltage excites the first reaction. The impulse $a$ as it occurs in the immediate vicinity of the supply line in the water is therefore drawn shorter than $t$. At a certain distance $b$ the impulse is somewhat deformed. Its voltage is lower and its duration longer; but it does not yet have the duration $t$ at the level $Ug$. At a larger distance $c$ from the supply cable 9 the deformation has progressed so that during the minimum period $t$ the shape voltage is effective on the fish. The same is true at a still larger distance $d$. Here the impulse voltage exceeds the required minimum voltage $Ug$ only by a small amount, but the effective period has become greater than $t$. At a still larger distance $e$ the impulse is deformed so much that the shape voltage on the fish is no longer reached and no action takes place.

Thus by conveniently choosing the length and the height of the impulses it can be attained that the field of influence about the conductor cable 9 is either increased or shifted to a greater distance. It has been found that even when the impulse duration $t$ is not reached an action on the fish may still be obtained if the impulse voltage is high enough. Hence by a proper selection of the magnitude of the impulse voltage and of the impulse duration an effect may also be secured in the immediate vicinity of the supply cable although the impulse duration is smaller than $t$. I recommend to choose the conditions so that the effect on the fish in the immediate vicinity of the supply line 9 is not larger than at a certain distance, for instance, of several meters. In this way an influence field is secured which surrounds the cable 9 concentrically and which is larger than the field resulting from the same expenditure in energy if the impulses are given a minimum duration $t$ corresponding to the experiences heretofore available.

For fishing with dragged electrodes it is essential to create a field as large as possible in which the fish are stopped at least so long that they can be caught by the dragged net. If direct-current impulses or current impulses with a predominating direct-current component are sent out, the reaction on the fish will begin at the limits of the field first with a directional effect. Therefore the fish will be oriented in the direction to the anode and will swim even against the anode if the intensity of the electrical field is sufficient. Therefore it is also sufficient if only a tubelike field of influence is produced around the supply line 9 (Fig. 13), i. e. inside of a circle with the radius $r2$ around the line 9. No or nearly no effect on the fish appears at the radius $r1$ where the influence field begins and about at radius $r2$ where the field ends. Such a tubular field may readily be obtained by suitably selecting the magnitude of the impulse voltage and the impulse duration as explained. Fish coming from the outside into the effective field range near the external radius $r2$ are affected and can not leave this range.

For trawling, the direct electrode 6 may be connected to the positive terminal of the condenser 1, and the net opening may be arranged around or behind the electrode 6 (see Figs. 1a and 15). For catching fish of greater length it may also be advantageous to apply the positive potential to the electrode 5 on or near the boat and to dimension the impulses so that in the influence field of the radius $r2$ (Fig. 13) mainly a guiding influence takes place but no killing or stunning. In that case a tubular influence field of a relatively small wall thickness is sufficient, thus keeping the impulse voltage relatively low (see Fig. 12). The fishes, approaching the line 9 at the distance $r2$ (Fig. 13) are then directed to the anode 5 where they can more readily be caught, hooked or harpooned, especially if they are stunned by the larger density of the electrical field around the electrode 5. As mentioned, the inductivity of the water gap and of the lines 8 and 9 (Fig. 1) is appreciable in salt water when short impulses are used. As the capacity of the impulse condenser 1 is also very large and may have some thousands of microfarads, the discharge of the condenser takes place as oscillation whose frequency and damping depend upon the constants L (inductivity), C (capacity) and R (ohmic resistance) of the oscillatory circuit. The phase displacement between current and voltage will usually be relatively large. In consequence, the first passage of the current wave through the zero value lags considerably the first zero passage of the voltage wave. In that case, the issued pulses are not unidirectional but consist of alternating-current pulses with a superimposed direct current which is the smaller the larger the phase displacement is between current and voltage. As mentioned, the larger this direct-current component the better is the influence on the swimming direction of the fish.

Hence it is advantageous to dimension the inductivity of the active circuit 10 and the capacity of the impulse condenser 1 in such a manner that, for any oscillation originated by the condenser discharge, the time from the beginning of the discharge to the first zero passage of the voltage is essentially greater than the time difference between the first zero passage of the voltage and the first zero passage of the current.

In the diagram of Fig. 14 the current J and the voltage U during an impulse are shown in dependence on the time $t$. The impulse voltage U has its full magnitude at the beginning of the impulse and declines during the progressing discharge of the impulse condenser 1. The discharging current J rises in the same time from zero to a maximum value and then decreases again. The passage of the current through zero takes place a period $T_2$ later than the zero passage of the voltage at the end of the period $T_1$. As explained with reference to Fig. 1, the discharging circuit 10 is interrupted when the current passes through zero so that the impulse is finished at the end of the period $T_1+T_2$. By comparison of the two shaded areas (Fig. 14) it is obvious that the direct current component of the impulses is larger and therefore the directing effect on the fish better, the smaller the period $T_2$ is in comparison with the period $T_1$. By properly dimensioning the capacity of the impulse condenser 1 and the inductivity L of the active circuit 10, the period $T_1$ should be kept longer than at least twice the period $T_2$.

Since the capacity of the active circuit is given essentially by the capacity of the impulse condenser 1, it is useful to meet the above-mentioned conditions by making the ratio of the inductivity L of the active circuit 10 to the ohmic resistance R as small as possible. Because of the application of short impulses, the inductivity L is given essentially by the current displacement. The greater the diameter of the line 9 and the higher the frequency of the current, i. e. the shorter the impulse duration, the smaller is the resulting inductivity. Therefore it is suggested to diminish the inductivity L of the active circuit 10 by chosing the diameter of the line 9 larger than would be necessary only with respect to the magnitude of the impulse current. This may be done by designing the line 9 as a hollow cable or as a multicore cable. A decrease in inductivity of the active circuit 10 may also be obtained by energizing the distant electrode 6, and possibly also by supply the electrode 5, through several parallel lines. Also the two means, i. e. a subdivision of the supply line to the electrodes into several electrical parallel lines and the choice of a larger diameter, may be used simultaneously. According to Fig. 15, for instance, the supply line from the power supply unit 102 on the boat 100 to the electrode 6 in front of the net 101 is divided into three leads 9, 9a, and 9b which may consist of hollow or other large-diameter cables. In respect to the most advantageous distance of the lines, when subdividing the supply line into different parallel wires, attention should be given to the following:

The physiological effect on the fish depends on the current flowing through the fish. The magnitude of this current is dependent on the voltage between head and tail and on the total resistance of the fish. The total resistance of the fish is composed of the merely ohmic resistance R and of the reactance jL of the fish. While the ohmic resistance R depends on the distance of the fish from the line 9, the reactance jL of the fish is a function of the distance of the fish from the supply line as well as of the impulse frequency. The larger the distance is for a given frequency, the larger the reactance jL will be. Therefore it may occur at a certain distance from the line 9 that the reactance of the fish will be greater than its ohmic resistance and that therefore the reactance will be the main factor governing the degree of the physiological stimulation. The arrangement of several parallel supply lines decreases the ohmic resistance and therefore increases the current.

This enlargement of the supply line system placed in the water can be utilized for an enlargement of the fishing area especially when there is no overlapping of the different areas, concentrated around each of the parallel lines, in which the reactance is still small in respect to the ohmic resistance. For this reason, it is advantageous to mutually space the parallel supply lines a minimum distance at which the reactance of a single fish swimming in the midst between two of the supply lines equals about the ohmic resistance of the fish.

A large portion of the cost of the electrical fishing equipment consists in the price of the impulse condenser 1, which may have several thousands of microfarads when designed for about five pulses per second. This price may be reduced by decreasing the capacity. The resulting shortening of the pulses may be compensated for by using the last mentioned means with an increased pulse frequency. Nevertheless, in order to apply electrical shocks to the fish in a rhythm which is slow in comparison to the impulse frequency, several consecutive short high-frequency pulse trains may be given which are interrupted by long intervals.

The meaning of the word "fish" as used in this specification and in the appended claims does not only include fish in a merely zoological sense but is intended to also refer to other aquatic animals which can be electrically influenced and caught in a similar way.

I claim:

1. An electrical circuit adapted for use in discharging electric current through a pair of spaced electrodes immerged in sea water, comprising a direct current source, a condenser continuously connected to said source when in operation to be electrically charged thereby, periodic switching means connecting the electrodes to the condenser at the instant of highest charge therein for oscillatively discharging said condenser through the sea water, and a choke coil connected in series with said condenser and with said direct current source whereby said condenser is oscillatively charged, said choke coil being adapted to limit the charging current of said condenser during its discharge period and as long as the countervoltage of said condenser is low, said switch means being operative to effect disconnection of said electrodes from said condenser as the discharge current of said condenser through said salt water passes through zero.

2. An electrical circuit adapted for use in discharging electric current through a pair of spaced electrodes immerged in sea water, comprising a direct current source, a condenser continuously connected to said source when in operation to be electrically charged thereby, periodic switching means connecting the electrodes to the condenser at the instant of highest charge therein for oscillatively discharging said condenser through the sea water, and a choke coil connected in series with said condenser and with said direct current source whereby said condenser is oscillatively charged, said choke coil being adapted to limit the charging current of said condenser during its discharge period and as long as the countervoltage of said condenser is low, said switch means being operative to effect disconnection of said electrodes from said condenser as the discharge current of said condenser through said salt water passes through zero, and said coil being subdivided in groups of turns and having terminal means for selectively connecting said groups in parallel and in series.

3. An electrical circuit adapted for use in discharging electric current through a pair of spaced electrodes immerged in sea water, comprising a direct current source, a condenser continuously connected to said source when in operation to be electrically charged thereby, periodic switching means connecting said electrodes to said condenser for oscillatively discharging said condenser through said sea water, and reactive means series connected between said source and said condenser for limiting the charging current of said condenser during its discharge period and as long as the countervoltage of said condenser is low, said relative means being cooperative with said source and said condenser to effect the oscillatory charging of said condenser, said condenser having selective means for changing its capacity.

4. An electrical circuit adapted for use in discharging electric current through a pair of spaced electrodes immerged in sea water, comprising a direct current generator, means on said generator for regulating its voltage, a condenser continuously connected across said generator when in operation to be electrically charged thereby, periodic switching means connecting said electrodes to said condenser at the instant of highest charge therein for oscillatively discharging said condenser through the sea water, and reactor means series connected between said generator and said condenser for limiting the charging current of said condenser during its discharge period and as long as the countervoltage of said condenser is low, said reactor means being cooperative with said generator and said condenser to effect the oscillatory charging of said condenser.

5. An electrical circuit adapted for use in discharging electric current through a pair of spaced electrodes immerged in sea water, comprising a capacitor, a resonant charging circuit including said capacitor, said resonant charging circuit comprising a D. C. source and an inductive reactor in series with said source, a circuit connecting said electrodes with said capacitor for oscillatively discharging said condenser through said sea water, and switch means in series with said discharge circuit for closing said discharge circuit when said resonant charging circuit has effected substantially peak voltage charge of said condenser.

6. An electrical circuit adapted for use in discharging electric current through a pair of spaced electrodes immerged in sea water, comprising a capacitor, a resonant charging circuit including said capacitor, said resonant charging circuit comprising a D. C. source and an inductive reactor in series with said source, a circuit connecting said electrodes with said capacitor for oscillatively discharging said condenser through said sea water, and a gas-discharge tube in series with said discharge circuit for closing said discharge circuit when said resonant charging circuit has effected substantially peak voltage charge of said condenser and for opening said discharge circuit when the discharge current falls to zero.

7. An electrical circuit adapted for use in discharging electric current through a pair of spaced electrodes immerged in sea water, comprising a capacitor, a resonant charging circuit including said capacitor, said resonant charging circuit comprising a D. C. source and an inductive reactor in series with said source, a circuit connecting said electrodes with said capacitor for oscillatively discharging said condenser through said sea water, a gas-discharge tube connected in series in said discharge circuit and operative to close said discharge circuit when said resonant charging circuit has effected substantially peak voltage charge of said condenser and to open said discharge circuit when the discharge current falls to zero, said gas-discharge tube having a control grid, and D. C. potential-producing means in circuit with said charging circuit and dependent upon the direction of current therein for biasing said control grid.

8. An electrical circuit adapted for use in discharging electric current through a pair of spaced electrodes immerged in sea water, comprising a capacitor, a resonant charging circuit including said capacitor, said resonant charging circuit comprising a D. C. source and an inductive reactor in series with said source, a circuit connecting said electrodes with said capacitor for oscillatively discharging said condenser through said sea water, a gas-discharge tube connected in series in said discharge circuit for closing said discharge circuit when said resonant charging circuit has effected substantially peak voltage charge of said condenser and for opening said discharge circuit when the discharge current falls to zero, said gas-discharge tube having a control grid, and variable D. C. potential-producing means in circuit with said charging circuit and dependent upon the direction of current therein for biasing said control grid, said potential-producing means comprising a voltage dropping resistor, means to rectify the voltage across said resistor, a load circuit across said voltage rectifying means and a triode controlled by the voltage across said load circuit.

9. An electrical circuit adapted for use in discharging electric current through a pair of spaced electrodes immerged in sea water, comprising a capacitor, a resonant charging circuit including said capacitor, said capacitor comprising a plurality of series-parallel connected condensers adapted to be selectively inter-connected in various series and parallel arrangements for varying the capacitance thereof, said resonant charging circuit comprising a D. C. source and an inductive reactor in series with said source, said inductive reactor comprising a plurality of separate windings adapted to be selectively inter-connected in various series and parallel arrangements for varying the inductance of said reactor, a circuit connecting said electrodes with said capacitor for oscillatively discharging said condenser through said sea water, and switch means in series with said discharge circuit for closing said discharge circuit when said resonant charging circuit has effected substantially peak voltage charge of said condenser.

10. An electrical circuit adapted for use in discharging electric current through a pair of spaced electrodes immerged in sea water, comprising a capacitor, a resonant charging circuit including said capacitor, said resonant charging circuit comprising a D. C. source and an inductive reactor in series with said source, a circuit connecting said electrodes with said capacitor for oscillatively discharging said condenser through said sea water, and switch means in series with said discharge circuit for closing said discharge circuit when said resonant charging circuit has effected substantially peak voltage charge of said condenser, and a water-tight container, said capacitor and said switch being located in said container, said container being in the sea water remote from said source and near to one of said electrodes.

References Cited in the file of this patent

UNITED STATES PATENTS

| Re. 22,572 | Miller | Nov. 28, 1944 |
|---|---|---|
| 1,838,981 | Anderson | Dec. 29, 1931 |
| 1,980,452 | Tice et al. | Nov. 13, 1934 |
| 2,071,958 | Watrous | Feb. 23, 1937 |
| 2,163,282 | Hovden | June 20, 1939 |
| 2,233,045 | Bonner et al. | Feb. 25, 1941 |
| 2,238,897 | Gomez | Apr. 22, 1941 |
| 2,343,300 | Klumb | Mar. 7, 1944 |
| 2,400,113 | Haine | May 14, 1946 |
| 2,426,037 | Mahoney et al. | Aug. 19, 1947 |
| 2,464,279 | Zarem et al. | Mar. 15, 1949 |
| 2,480,681 | Stiefel | Aug. 30, 1949 |
| 2,512,354 | Marbury | June 20, 1950 |

FOREIGN PATENTS

| 176,096 | Great Britain | Feb. 27, 1922 |
|---|---|---|
| 426,201 | Great Britain | Mar. 19, 1935 |
| 496,864 | Belgium | July 31, 1950 |
| 738,750 | France | Dec. 29, 1932 |

OTHER REFERENCES

Cooke and Marcus: "Electronics Dictionary," page 323. Published 1945 by McGraw-Hill Book Co., New York.

"Discovery," page 29, January 1950 issue.